United States Patent [19]

Nakamura

[11] 4,314,125

[45] Feb. 2, 1982

[54] ELECTRIC SEAM WELDING DEVICE IN THE PRODUCTION EQUIPMENT OF HOT-DIP METAL-COATED STEEL TUBES

[76] Inventor: Matsuichi Nakamura, 26, 5-chome, Itachibori-minamidori, Nishi-ku, Osaka-shi, Osaka-fu, Japan

[21] Appl. No.: 185,881

[22] Filed: Sep. 9, 1980

Related U.S. Application Data

[63] Continuation of Ser. No. 9,443, Feb. 5, 1979, abandoned.

[30] Foreign Application Priority Data

May 13, 1978 [JP] Japan .................................. 53/14173

[51] Int. Cl.³ ............................................. H05B 6/14
[52] U.S. Cl. ..................... 219/8.5; 219/9.5; 228/147; 228/17.7
[58] Field of Search ............ 219/8.5, 9.5, 10.49 R, 219/59.1, 74; 228/17, 17.5, 17.7, 146, 147, 150

[56] References Cited

U.S. PATENT DOCUMENTS

| | | | |
|---|---|---|---|
| 3,270,176 | 8/1966 | O'Neill et al. | 219/8.5 |
| 3,379,853 | 4/1968 | Domizi | 219/8.5 |
| 3,406,271 | 10/1968 | Cachat et al. | 219/8.5 |
| 3,584,176 | 6/1971 | Cannon et al. | 219/8.5 |
| 3,619,535 | 11/1971 | Sullivan | 219/8.5 |
| 3,648,005 | 3/1972 | Rudd | 219/8.5 |
| 3,689,725 | 9/1972 | Hammer et al. | 219/8.5 |
| 3,763,342 | 10/1973 | Oppenheimer | 219/8.5 X |
| 3,927,816 | 12/1975 | Nakamura | 228/147 |

*Primary Examiner*—Bruce A. Reynolds
*Assistant Examiner*—Philip H. Leung
*Attorney, Agent, or Firm*—Jones, Thomas & Askew

[57] ABSTRACT

This invention relates to the means of continuously seam-welding the areas to be joined together of steel strips formed like tubes in the production of hot-dip metal-coated steel tubes from steel strips in a continuous supply. This seam welding device is capable of manufacturing electric seam-welded tubes with high efficiency and operational safety.

2 Claims, 6 Drawing Figures

ELECTRIC SEAM WELDING DEVICE IN THE PRODUCTION EQUIPMENT OF HOT-DIP METAL-COATED STEEL TUBES

This application is a continuation of application Ser. No. 9,443, filed Feb. 5, 1979, now abandoned.

BACKGROUND OF THE INVENTION

This invention relates to the hot-dip metal-coated steel tube production system consisting of an electric seam-welded tube production equipment wherein steel strips are worked into tubes through a forming roll and a hot-dip metal-coating device.

In such a production system, high quality tubes can be produced at the cost as low as ⅔ to 1/10 of that by the conventional gas welding or low-frequency electric welding process, and at the same time, they can be coated with the molten metal. For this reason, the hot-dip metal-coated steel tube production system insures higher production with high efficiency than the conventional two processes individual production method.

In a high-frequency induction welding process, the saturated magnetic flux density is considered to be raised for a higher welding speed by inserting ferrite cores into tubes to be welded together. This saturated magnetic flux density sharply drops, if the ferrite core temperature exceeds a certain temperature, for example, 180° C. Consequently, the cores should be cooled to prevent a rise in their temperature. In the current method, the cooling water is supplied into a core assembly case containing ferrite cores from its one end. This cooling water is discharged from the other end of the said case toward the inner surface of a welded pipe. In the present integrated production system wherein the molten metal coating is effected immediately after the high-frequency induction welding process, however, cooling of the cores with liquid is practically very dangerous because of a possibility of such an accident as explosion caused by contact of the cooling water with the molten metal due to an unsatisfactory welding practice.

Further, in the integrated production system, the pipe inner surfaces are painted in the subsequent process and therefore, if the cooling water is used as stated above, a special drying process is required, resulting in the increased equipment cost and in the complicated production process.

SUMMARY OF THIS INVENTION

This invention pertains to a device serving for continuous seam-welding of the areas to be joined together of steel strips formed into tubes in the production of hot-dip metal-coated steel tubes from steel strips in a continuous supply. The object of this invention is to provide an electric seam-welding device which is installed nearby the areas of steel strips to be joined together, surrounding the welding work coil. A cylinder having the insulation and heat resistances is inserted into a position opposite to the said welding work coil and, one or more ferrite cores are set in the cylinder. The presurized air or the air-liquid mixture is induced into the said cylinder for the forced cooling of the said ferrite cores.

DETAILED DESCRIPTION OF THE PREFERRED EMBODIMENT

Herein is described an application of this invention on the basis of the drawings, although this invention is not limited to this application.

Prior to the detailed description of the essential points of this invention, the production process of hot-dip metal-coated steel tubes from seam-welded tubes in the present integrated production plant is explained in sequence below.

Figure 1:
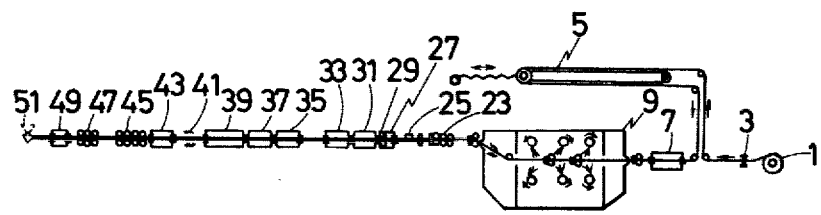
FIG. 1 is an explanatory drawing of the entire production plant of hot-dip metal-coated steel tubes by means of the equipment related to this invention.

In FIG. 1, steel strips being fed out of an uncoiler 1 are welded into continued steel strips on a shear-end welder 3, which are further fed into a looper 5, where they are temporarily stored to prevent their discontinued supply. Then, steel strips are fed from a looper 5 to a forming roll 23 through a cleaning unit 7 and a shot blast unit 9. On the forming roll, they are formed into tubes and subjected continuously to an axial seam-welding process. Such seam-welded tubes are plated with the molten metal in a molten metal plating unit 39 through a temperature controller 27, a pickling unit 31, a flushing unit 33, flux coating unit 35, and a drying-preheating unit 37. Thereafter, the excess metal sticking on steel tube surfaces is wiped off. Then, they pass through a blow-off unit 41 to prevent dropping of the molten metal and cooled in a cooler 43.

Further, their sections are sized to the specified dimensions on a sizing rolls 45 and their flexure is corrected on a straightening unit 47. Their surfaces are finished on a surface treatment unit 49. On a shearing unit 51, they are cut into products as specified.

Now, an electric seam-welding device, an essential component in this invention, located at the nearly midpoint of the production process is described in details below, referring to FIG. 2.

Figure 2:
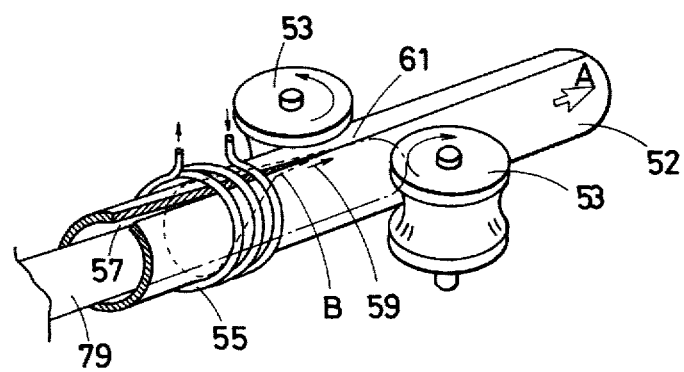
FIG. 2 is an oblique view of the electric seam-welding device in the equipment related to this invention and FIG. 3 is a partial longitudinal sectional view of FIG. 2.
Figure 4:
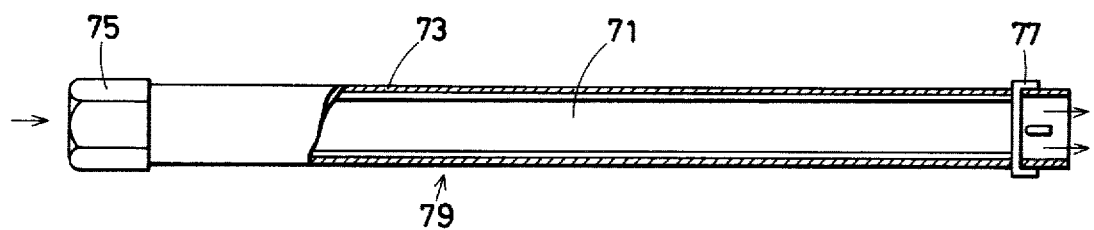
FIG. 4 (a), (b), and (c) are partial longitudinal sectional views of ferrite cores in different forms respectively in the equipment related to this invention.
Figure 4:
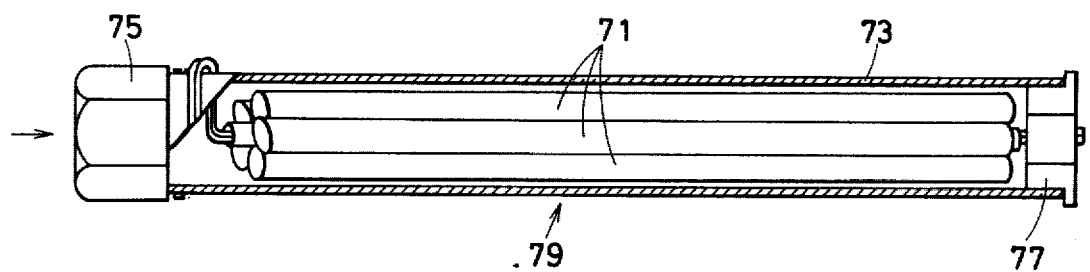
Figure 4:
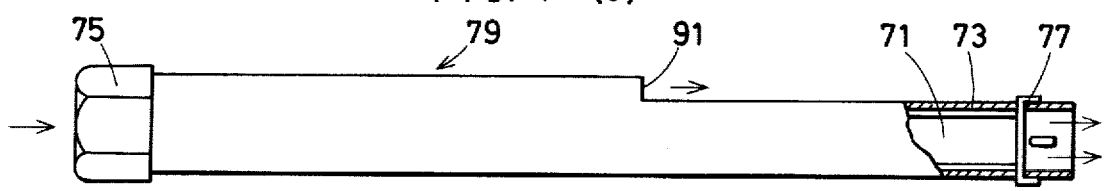

In FIG. 2, a welded steel tube 52 is fed into a direction indicated by an arrow A, while being compressed on squeeze rolls. 55 is the high-frequency induction coil. Those steel strips which are fed as the tubes worked on a forming roll 23 have such a shape as provided with a V-shaped gap 57 in a direct front of the said induction coil. The V-shaped gap 57 is pressed under the squeeze rolls 53, while being melted by the current induced through the high-frequency induction coil 55. The welding process is terminated at a welding point 61. If steel strips formed into tubes on the forming roll 23 illustrated in FIG. 1 reach an area surrounded by the high-frequency induction coil, the high-frequency induced current 59 flows as indicated by the dash line B. This induced current flows from the edge of the V-shaped gap 57 to a welding point 61 in a concentrated manner as indicated by the dash line B owing to the combined effect of the skin effect (property of the current toward the concentrated flow along the surface of a conductor) and the proximity effect (property of the currents opposite in the direction to flow, approaching each other). Since the high-frequency current 59 induced by the high-frequency induction coil 55 flows, concentrating around the welding point 61 as described above, a high-frequency seam-welding can be expected. However, it is practically difficult to raise a welding speed under such conditions. In order to raise the degree of concentration of the said induced current, it is effective to insert such a ferromagnetic ferrite core as shown in FIG. 4 into the tube containing the V-shaped gap 57, high-frequency induction coil 55 and a welding point 61.

Figure 3:
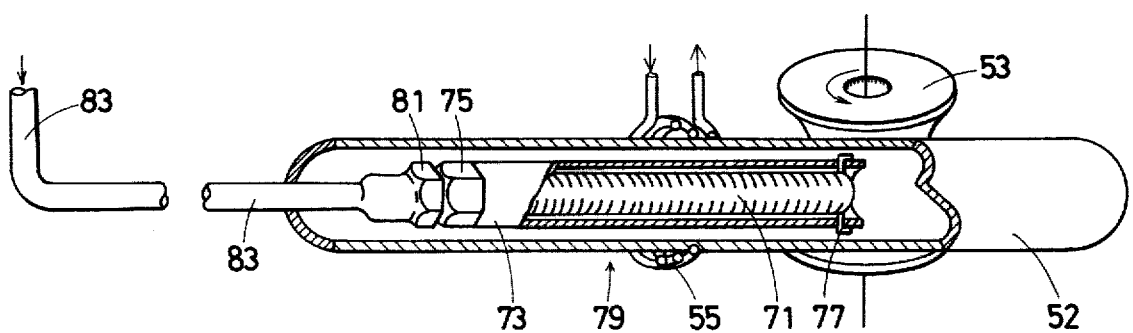

This ferrite core has such functions as reducing the high-frequency leaking magnetic fluxes as the reactive components escaping into clearance between the induction coil 55 and tubular steel strip, and as increasing the effective fluxes by inducing most of the magnetic fluxes developed by the high-frequency induction coil 55 into the tubular steel strip. In consequence, the induced current to the tubular steel strip is increased. Since the quantity of heat generated by this induced current is in proportion to the square of the amperage, insertion of a ferrite core 71 is effective for an increase in the welding speed. The ferrite core as a ferromagnetic substance is desirable to be large in the permeability and the flux density as well as excellent in the frequency and temperature characteristics. Such a ferrite core as described above is further explained in details, referring to FIG. 3.

A ferrite core 71 is normally set in an electrically insulating and heat resisting case 73 provided with a joint 75 on one end and with a core stopper 77 on the other end. A ferrite core assembly 79 built in this manner does not only protect the core from the high heat but prevents the dropping of the saturated flux density due to a rise in temperature of the ferrite core as described previously. Consequently, the ferrite core is considered to be cooled by letting the coolant into the assembly by connecting the coolant pipe 83 provided with a joint 81 to be coupled to the said joint 75. When water is used as the coolant by allowing it to flow into a core assembly 79 through pipe 83 to cool assembly 79, it is discharged out of the core assembly 79 from the other end, resulting in the water collected inside a seam-welded tube 52.

In the integrated production system introduced in this invention, such processes for inducing explosion in the molten metal coating process after seam-welding as well as for drying pipe inner surfaces for painting are required, resulting not only in the increased equipment cost but in the complicated production process.

In this invention, the liquid is prevented from being collected in a seam-welded pipe 52 by dividing a ferrite core into several pieces of cores as necessary (particularly in case of a large-size ferrite core, etc.) as shown in FIG. 4(b) and by employing the air or inert gas pressurized to 2 to 10 kg/cm² or the air-liquid mixture as the cooling liquid. In FIG. 4(b), several core pieces divided from a ferrite core similar to a small-diameter round bar are used. Of course, various forms of core assemblies are available, for example, many radially finned cores are provided in an assembly, in addition to those mentioned above. In short, it is ascertained to be very effective to provide the smallest possible clearance in a ferrite core 71 and to allow a high-efficiency, high-pressure cooling gas or an air-liquid mixture to flow through the clearance.

In an improved core assembly, such a step 91 with a jet opening (not shown) as shown in FIG. 4(c) is provided in a core assembly 79 opposite to a V-shaped gap 57 shown in FIG. 2. From this jet opening is exhaled part of the air or the air-liquid mixture used for cooling. Iron dust appearing on the inner surfaces of pipes at a welding point 61 and accumulating on a core assembly 79 is effectively blown away under high pressure.

As has been clarified by the above description, in the integrated production system using a high-frequency induction welding device provided with such a core assembly 79 as developed by this invention, not only tubes seamed by a high-frequency induction welding device can be produced with high efficiency and operational safety, but the inner surface finish of seam-welded tubes by painting is improved, because the surfaces are free from iron dust or moisture at the time of painting.

What is claimed is:

1. Apparatus for the production of hot-dip metal-coated steel tubes comprising means for cold forming steel strip having parallel edges into cylindrical tube and forcing the edges of the strip together in a seam, and means for immersing the tube into molten metal, the improvement therein comprising a high frequency welding coil means extending about the areas of the strip to be seam welded, an electrically insulating and heat resisting elongated approximately cylindrical case extending into the formed cylindrical portion of the steel strip at said welding coil and including an outer cylindrical surface closely spaced from the inner surface of the cylindrical portion of the formed steel strip, said cylindrical case including at one of its end portions a joint, an air conduit means connected to said joint for directing cooling air through said cylindrical case, said cylindrical case including at the other of its end portions an air outlet opening for exhausting the cooling air from said cylindrical case into the formed cylindrical portion of the steel strip at a position beyond the welding coil, said cylindrical case including a second air outlet opening at a position for directing a flow of the cooling air from said cylindrical case into the gap between the edges of the formed cylindrical portion of the steel strip to cool the edges of the steel strip and to blow away the iron dust appearing on the inner surface of the formed cylindrical portion of the steel strip at the welding point, a plurality of elongated ferrite cores each contained in and extending along substantially the full length of said cylindrical case and arranged in a bundle with respect to one another and disposed parallel to said cylindrical case and occupying a major portion of the diameter of said cylindrical case, and means for supplying air to said conduit means whereby the air flows into said cylindrical case and along and about said ferrite cores of the bundle of cores and then out the air outlet openings of said case and into the formed cylindrical portion of the steel strip to cool the case, cores and formed steel strip without hazard of explosion and into the gap between the edges of the steep strip to remove the iron dust from the formed steel strip.

2. The apparatus of claim 1 and wherein said cylindrical case includes a step for positioning in the gap between the edges of the formed cylindrical portion of the steel strip with said second air outlet opening directed from said step into the gap between the edges of the formed cylindrically portion of the steel strip to remove iron dust appearing on the inner surfaces of the formed steel strip at the welding point and accumulating on the cylindrical case.

\* \* \* \* \*